(12) United States Patent
Greenwood et al.

(10) Patent No.: US 10,977,224 B2
(45) Date of Patent: Apr. 13, 2021

(54) DYNAMIC MODELING OF DATA IN RELATIONAL DATABASES

(71) Applicant: QuickBase, Inc., Cambridge, MA (US)

(72) Inventors: Matthew J. Greenwood, Kingston, MA (US); Sergio Haro, Seattle, WA (US); Sharon Hershon, Marlborough, MA (US)

(73) Assignee: QuickBase, Inc., Cambridge, MA (US)

(*) Notice: Subject to any disclaimer, the term of this patent is extended or adjusted under 35 U.S.C. 154(b) by 502 days.

(21) Appl. No.: 15/705,443

(22) Filed: Sep. 15, 2017

(65) Prior Publication Data

US 2018/0004782 A1  Jan. 4, 2018

Related U.S. Application Data (63) Continuation-in-part of application No. 15/652,765, filed on Jul. 18, 2017, which is a continuation of application No. 14/448,619, filed on Jul. 31, 2014, now Pat. No. 9,740,713.

(51) Int. Cl.
| | | |
|---|---|---|
| *G06F 17/00* | (2019.01) | |
| *G06F 7/00* | (2006.01) | |
| *G06F 16/21* | (2019.01) | |
| *G06F 16/23* | (2019.01) | |
| *G06F 16/2455* | (2019.01) | |
| *G06F 16/242* | (2019.01) | |

(52) U.S. Cl.
CPC ........ *G06F 16/213* (2019.01); *G06F 16/2379* (2019.01); *G06F 16/2423* (2019.01); *G06F 16/2456* (2019.01)

(58) Field of Classification Search
CPC .............. G06F 16/213; G06F 16/2379; G06F 16/2456; G06F 16/2423
USPC .......................................................... 707/774
See application file for complete search history.

(56) References Cited

U.S. PATENT DOCUMENTS

| | | | | |
|---|---|---|---|---|
| 6,076,092 A | * | 6/2000 | Goldberg | .............. G06F 16/252 |
| | | | | 707/683 |
| 6,389,429 B1 | * | 5/2002 | Kane | ................ G06Q 10/06393 |
| | | | | 707/609 |
| 6,473,765 B1 | * | 10/2002 | Fink | ...................... G06F 16/258 |
| | | | | 707/702 |
| 6,725,235 B1 | * | 4/2004 | Dyer | ...................... G06F 30/15 |
| | | | | 715/771 |

(Continued)

*Primary Examiner* — Pavan Mamillapalli
(74) *Attorney, Agent, or Firm* — Davis Malm & D'Agostine, P.C.; David J. Powsner (57) ABSTRACT

The disclosed embodiments provide a system that facilitates making updates to a data model, wherein the data model is associated with data items stored in a relational database system. In particular, updates to the data model are automatically propagated to the relational database system so that the structure of the relational database system remains consistent with the data model. This is accomplished by automatically executing queries corresponding to the updates against the relational database system. For example, changes to fields and/or tables in the data model can be automatically propagated to a relational database system by executing "Create," "Drop," "Alter," and/or "Add" statements against corresponding fields and/or tables in the relational database system.

34 Claims, 5 Drawing Sheets

(56) References Cited

U.S. PATENT DOCUMENTS

| | | | | |
|---|---|---|---|---|
| 7,257,597 B1* | 8/2007 | Pryce | ................... | G06F 16/214 |
| | | | | 707/999.101 |
| 7,490,073 B1* | 2/2009 | Qureshi | ................ | G06F 11/079 |
| | | | | 706/50 |
| 7,647,298 B2* | 1/2010 | Adya | .................. | G06F 16/2445 |
| | | | | 707/999.002 |
| 7,657,516 B2* | 2/2010 | Zaman | .................. | G06F 16/283 |
| | | | | 707/999.004 |
| 8,335,772 B1* | 12/2012 | Ramesh | .............. | G06F 16/2379 |
| | | | | 707/694 |
| 8,407,255 B1* | 3/2013 | Srivastava | .......... | G06F 16/2456 |
| | | | | 707/791 |
| 8,600,994 B1* | 12/2013 | Xu | .......................... | G06F 16/40 |
| | | | | 707/737 |
| 9,317,557 B2* | 4/2016 | Shao | .................. | G06F 16/2456 |
| 9,740,713 B1 | 8/2017 | Greenwood et al. | | |
| 2003/0101035 A1* | 5/2003 | Gabele | ........... | G01R 31/318314 |
| | | | | 703/13 |
| 2004/0181538 A1* | 9/2004 | Lo | ......................... | G06F 16/288 |
| | | | | 707/999.1 |
| 2005/0154742 A1* | 7/2005 | Roth | ...................... | G06Q 10/10 |
| | | | | 707/999.1 |
| 2005/0160104 A1* | 7/2005 | Meera | ...................... | G06F 8/36 |
| | | | | 707/999.1 |
| 2006/0106832 A1* | 5/2006 | Ben-Dyke | ............ | G06F 16/284 |
| | | | | 707/999.1 |
| 2007/0050323 A1* | 3/2007 | Dettinger | ................ | G06F 16/25 |
| | | | | 707/999.001 |
| 2007/0162274 A1* | 7/2007 | Ruiz | ...................... | G06F 16/243 |
| | | | | 704/9 |
| 2007/0226203 A1* | 9/2007 | Adya | .................. | G06F 16/2445 |
| | | | | 707/999.004 |
| 2010/0169380 A1* | 7/2010 | Miller | ....................... | G06F 8/35 |
| | | | | 707/791 |
| 2011/0307501 A1* | 12/2011 | Terwilliger | ........... | G06F 16/213 |
| | | | | 707/756 |
| 2012/0246179 A1* | 9/2012 | Garza | ................... | G06F 16/214 |
| | | | | 707/752 |
| 2017/0371903 A1 | 12/2017 | Greenwood et al. | | |
| 2018/0189397 A1* | 7/2018 | Norman | ................ | G06F 16/951 |

* cited by examiner

DYNAMIC MODELING OF DATA IN RELATIONAL DATABASES

This application is a continuation in part of same-titled U.S. patent application Ser. No. 15/652,765, filed Jul. 18, 2017, which is a continuation of same-titled U.S. patent application Ser. No. 14/448,619, filed Jul. 31, 2014, now U.S. Pat. No. 9,740,713, the teachings of all the foregoing of which are incorporated herein by reference.

BACKGROUND OF THE INVENTION

The disclosed embodiments relate to data modeling. More specifically, the disclosed embodiments relate to techniques for performing dynamic modeling of data in relational databases.

Relational database management systems (RDBMS) commonly interface with applications using a dialect of Structured Query Language (SQL). For example, an application may use SQL as a data manipulation language (DML) for adding, deleting, selecting, and/or updating records in a relational database. The application may also use SQL as a data definition language (DDL), which enables the creation, update, and deletion of tables and/or columns in the relational database.

For a developer, operations with a relational database are mostly static; that is, given a database schema, an application developer will build a parallel structure using a programming language that allows the developer to model entities that map to tables in a database. For example, in an application that supports Customer objects, a 'Customer' may exist as an object as well as a table, where the object is directly paired to the table. Thus, fields of the Customer object may have a one-to-one correspondence with the columns of the Customer table. The mapping from object to table is static—for the lifetime of the Customer object, a static set of fields will be associated with both the object and the table. This suits the vast majority of use cases, since schemas typically change infrequently for most applications. Moreover, when the schemas do change, alteration of the objects and/or extension of the application to support the new schema are traditionally acceptable.

To facilitate such static mappings, a developer may use a tool to map classes in the application to database schemas using configuration files. The tool may provide an interface with an RDBMS by generating the DDL and DML required to create and update one or more databases represented by the database schemas. As a result, the tool may provide a database-agnostic access pattern for persisted data and hide the complexity of SQL and RDBMS semantics under a layer of abstraction.

On the other hand, the tool may not support models that dynamically change during application runtime because changes to a database model during runtime cause the database schema to no longer be compatible with the application model. Consequently, use of data models in relational databases may be facilitated by mechanisms for supporting dynamic updates to the data models during application runtime.

SUMMARY OF THE INVENTION

The disclosed embodiments provide a system that facilitates making updates to a data model, wherein the data model is associated with data items stored in a relational database system. In particular, updates to the data model are automatically propagated to the relational database system so that the structure of the relational database system remains consistent with the data model. This is accomplished by automatically executing queries corresponding to the updates against the relational database system. For example, changes to fields and/or tables in the data model can be automatically propagated to a relational database system by executing "Create," "Drop," "Alter," and/or "Add" statements against corresponding fields and/or tables in the relational database system.

During operation, the system executes an application that accesses a data model comprising one or more tables, wherein the one or more tables include a set of scalar fields and a derived field associated with at least one of a summary, a formula, and a lookup. Next, the system stores the scalar fields in a relational database. The system then uses the data model to generate a first query for the relational database to obtain data associated with the derived field using one or more joins of one or more of the scalar fields. Finally, the system enables use of the first query to provide the data to a user during use of the application by the user.

In some embodiments, the system also uses the application to obtain an update to the data model from the user. Next, the system generates a second query for the relational database corresponding to the update. The system then enables use of the second query to propagate the update to the relational database during use of the application by the user.

In some embodiments, the update is associated with at least one of creation of a new field, removal of an existing field, creation of a new table, and removal of an existing table.

In some embodiments, generating the first query for data associated with the derived field involves using the data model to create one or more expressions of the one or more tables, and generating the query from the one or more expressions. In some embodiments, those expressions are views; in others, they are common table expressions.

In some embodiments, using the data model to create the one or more expressions of the one or more tables involves:
(i) identifying one or more fields associated with the query;
(ii) determining necessary joins associated with the one or more fields;
(iii) transforming joined tables associated with the necessary joins; and
(iv) building the one or more expressions from the transformed joined tables.

In some embodiments, the necessary joins comprise nested joins.

In some embodiments, the query includes a Structured Query Language (SQL) query.

In some embodiments, the data is provided to the user through a user interface of the application.

BRIEF DESCRIPTION OF THE DRAWINGS

In the figures, like reference numerals refer to the same figure elements.

DETAILED DESCRIPTION OF THE ILLUSTRATED EMBODIMENT

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a system that supports dynamic modeling for data in relational database systems. During such dynamic modeling, a data model may be provided to a user by an application. Changes to the data model by the user may be propagated to a relational database during runtime of the application by generating and executing queries corresponding to the changes against the relational database. For example, changes to the fields and/or tables of the data model may be propagated to a SQL database by executing "Create," "Drop," "Alter," and/or "Add" statements against the SQL database.

Moreover, the data model may include one or more scalar fields containing static data and one or more derived fields that are linked to the scalar fields and/or other derived fields. For example, the derived fields may include a summary field that summarizes all data for another field using an operator, a lookup field that references another field, and/or a formula field that applies a mathematical formula to another field. Because the derived fields may not be represented as static fields in the relational database, data for the derived fields may be provided to the user using queries of the relational database. To generate the queries, the data model may be used to iterate through joined tables and/or fields of the relational database until scalar fields related to the derived fields are found. The joined tables may then be transformed using the scalar fields in the reverse order until the derived fields to be queried are reached.

Figure 1:
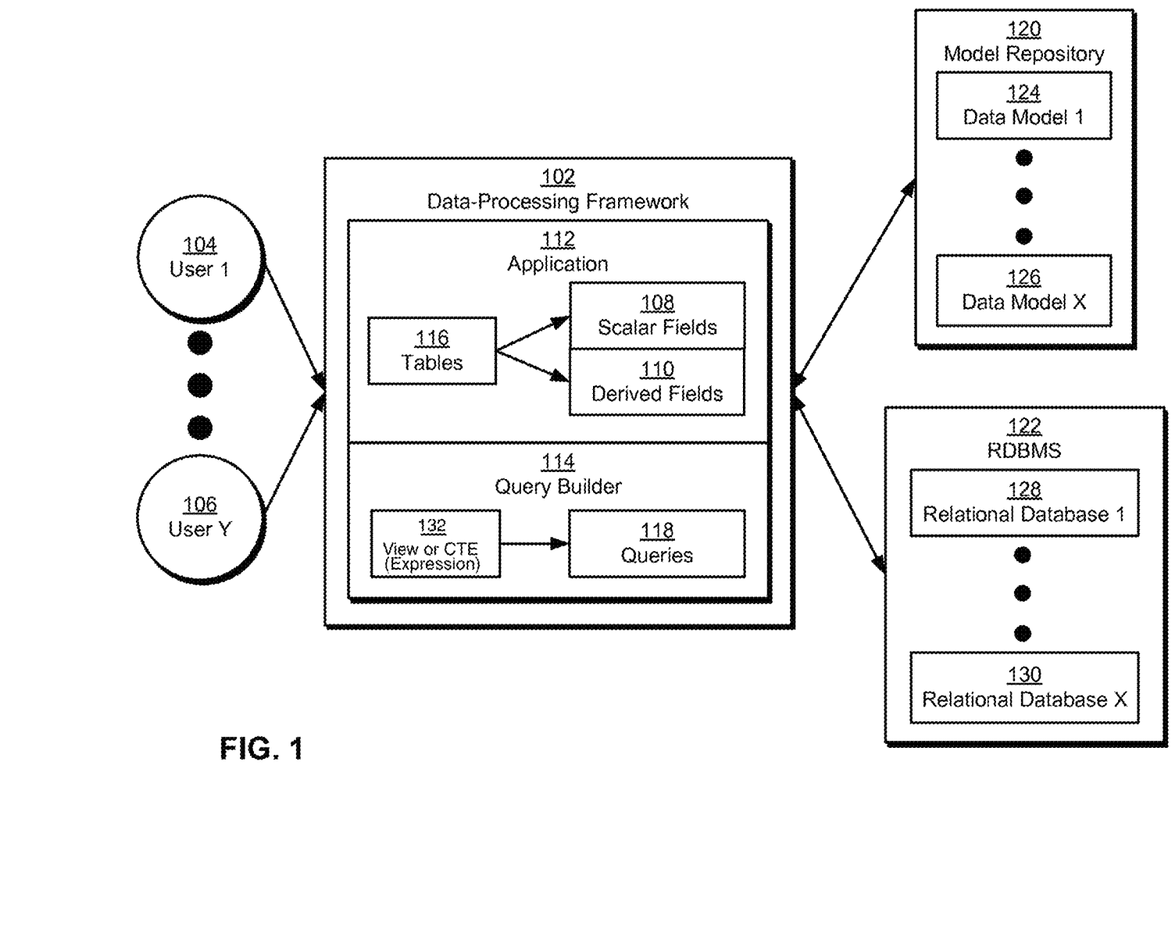
FIG. 1 shows a schematic of a system in accordance with the disclosed embodiments.

FIG. 1 shows a schematic of a system in accordance with the disclosed embodiments. The system may correspond to a data-processing framework 102 that is accessed by a set of users (e.g., user 1 104, user y 106). Data-processing framework 102 includes an application 112 and a query builder 114. Each of the components of data-processing framework 102 is described in further detail below.

In one or more embodiments, data-processing framework 102 provides dynamic modeling of data in relational databases (e.g., relational database 1 128, relational database x 130) such as Structured Query Language (SQL) databases. Such dynamic modeling may allow the users to access a set of data models (e.g., data model 1 124, data model x 126) of tables in the relational databases through application 112 and propagate updates to the data models to the relational databases during runtime of application 112. As a result, data-processing framework 102 may overcome limitations associated with programming techniques that statically map application objects to database tables and/or tools that perform compile-time introspection and mapping of application classes to database schemas.

Application 112 may allow one or more users to access one or more data models from a model repository 120. Each data model may be stored as a serialized object in model repository 120 and include one or more tables 116 containing fields such as scalar fields 108 and/or derived fields 110. During use of application 112, the data model may be loaded into memory of application 112, and the user may view values in the fields and/or tables 116 of a data model through a graphical user interface (GUI) and/or other user interface provided by application 112. The user may also use the user interface to add or remove records, fields, and/or tables 116 associated with the data model; define reports, forms, and/or relationships associated with the records, fields, and/or tables 116; and/or define roles and/or permissions for sharing the data model, reports, and/or forms with other users.

For example, the user may use graphical database software such as QuickBase (QuickBase™ is a registered trademark of Intuit, Inc.) to create application 112, use application 112 to create the data model, update the data model, share the data model, and/or perform operations (e.g., report generation) using the data model. Within QuickBase, application 112 may be added to the data model as the root of the data model.

As mentioned above, fields in the data model may include scalar fields 108 and derived fields 110. Scalar fields 108 may store static data such as text, numeric data, dates, times, and/or monetary values. Thus, scalar fields 108 may be mapped to fields in a relational database managed by a relational database management system (RDBMS) 122. For example, a scalar field in a data model representing an email address may be mapped directly to a field in the relational database containing the email address.

On the other hand, derived fields 110 do not explicitly contain data or exist in the schema of the relational database. Instead, derived fields 110 may be "virtual" fields that operate on other fields, which may be scalar or derived. For example, derived fields 110 may include a lookup field that performs a lookup of another field or table. Derived fields 110 may also include a summary field that summarizes a set of values of another field using an operator (e.g., arithmetic operator, Boolean operator, count, minimum, maximum, average, etc.). Derived fields 110 may further include a formula field that applies a mathematical formula, string-manipulation formula, date-manipulation formula, type-conversion operation (e.g., string to number, etc.), and/or other type of data-manipulation formula or operation to another field.

As a result, derived fields 110 may include implicit relationships with other fields in the data model. For example, a relationship of a derived field with another field in the data model may be described in the derived field using an identifier of the other field and/or an identifier of a table containing the other field. Because derived fields 110 may reference fields in other tables, derived fields 110 may be represented by database joins among two or more tables. A chain of references linking multiple derived fields may additionally result in the use of nested joins to represent the hierarchy of relationships associated with the derived fields.

In one or more embodiments, data-processing framework 102 supports synchronization of derived fields 110 and dynamic updates to the data model with the relational database containing data for the data model by using the data model to generate and execute queries 118 (e.g., SQL queries) against the relational database. As shown in FIG. 1, queries 118 may be provided by query builder 114 using one or more views 132 of tables 116 in the data model. Queries from query builder 114 may then be executed by application 112 and/or another component of data-processing framework 102 to perform dynamic modeling of data in the relational database.

First, query builder 114 may use the data model to generate a query for data associated with each derived field in the data model. To generate the query, query builder 114 may identify one or more fields associated with the query. For example, query builder 114 may add dependencies and/or criteria associated with the derived field to a list of fields to be returned. Next, query builder 114 may determine necessary joins associated with the one or more fields. For example, query builder 114 may identify other tables and/or fields in the tables required to perform the operation related to the derived field.

Query builder 114 may then transform joined tables associated with the necessary joins. For example, query builder 114 may iterate and/or recurse through joined tables related to the derived field until scalar fields related to the derived fields are found. The joined tables may then be transformed using the scalar fields in the reverse order until the original derived field is reached. Finally, query builder 114 may build views 132 from the transformed joined tables and use views 132 to generate the query in a language that may be used to interact with RDBMS 122. For example, query builder 114 may use the dependencies, joined tables, and/or fields identified in the previous steps to build views 132 and convert views 132 into the query using SQL syntax. Generation of queries for data in derived fields of data models is described in further detail below with respect to FIG. 2.

Second, query builder 114 may generate a query for each update to a table or field in the data model. The update may be used to create a new field, remove an existing field, create a new table, and/or remove an existing table. As a result, the update may be related to a data definition language (DDL) associated with RDBMS 122. To enable propagation of the update to the relational database, query builder 114 may use the DDL to generate a query corresponding to the update. For example, query builder 114 may generate a SQL query containing a "Create," "Drop," "Alter," and/or "Add" statement to update the relational database with a change to the structure of the data model. Alternatively, if the update is used to create or modify a derived field in the data model, query builder 114 may generate a query for obtaining data for the new or modified derived field, as described above.

Consequently, data-processing framework 102 may enable dynamic updates to data models during use of the data models by users. For example, data-processing framework 102 may allow the users to create or delete records, fields, tables, reports, forms, and/or other features using updates to the data models and share the updates in real-time with other users. Moreover, data-processing framework 102 may allow data in the data models to be persisted in relational databases by generating and executing queries that synchronize the data models with the relational databases. As a result, data-processing framework 102 may leverage the scalability and/or response times of the relational databases while providing additional features that are not supported by conventional relational databases.

Those skilled in the art will appreciate that the system of FIG. 1 may be implemented in a variety of ways. For example, application 112, query builder 114, and model repository 120 may be provided by a single physical machine, multiple computer systems, one or more virtual machines, a grid, one or more databases, one or more filesystems, and/or a cloud computing system. In addition, application 112 and query builder 114 may be implemented together and/or separately by one or more hardware and/or software components and/or layers.

Figure 2:
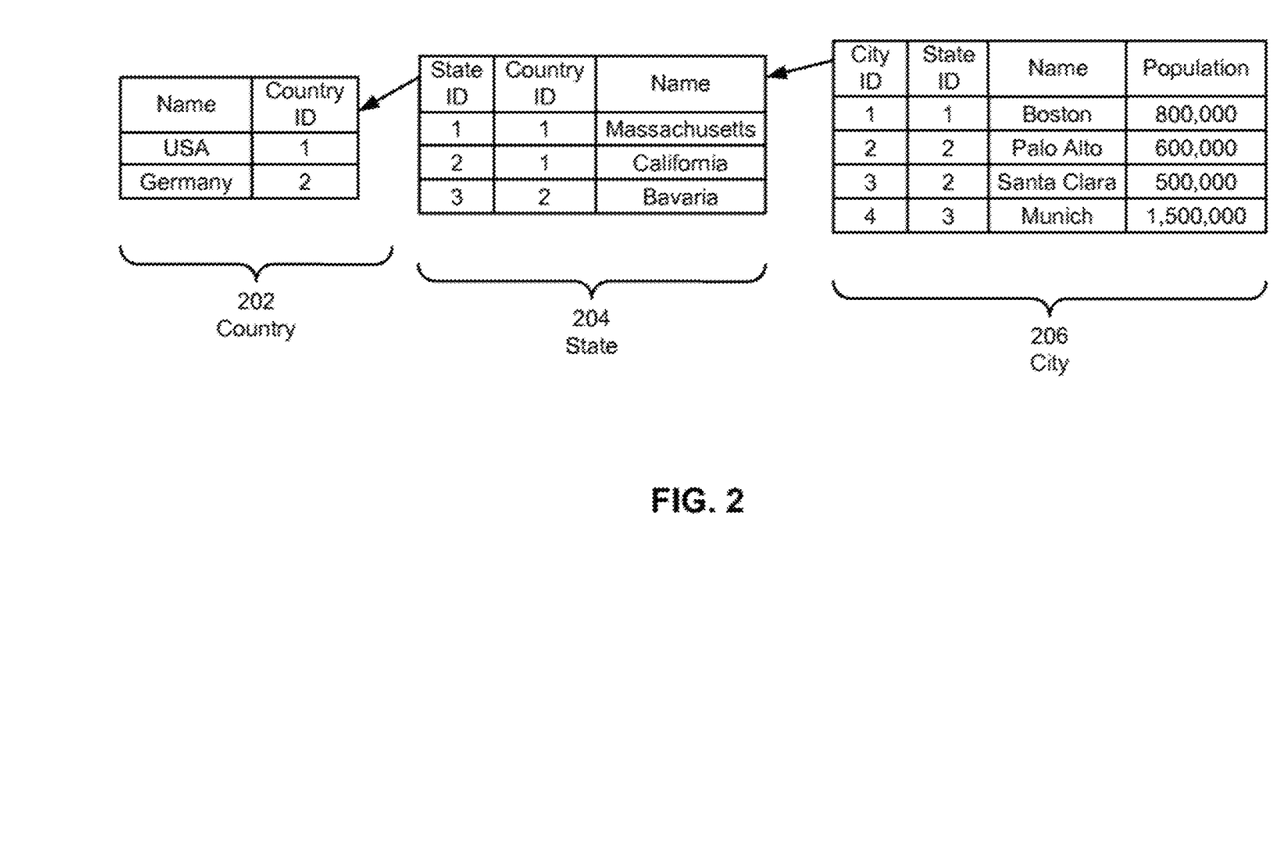
FIG. 2 shows an exemplary data model in accordance with the disclosed embodiments.

FIG. 2 shows an exemplary data model in accordance with the disclosed embodiments. The data model includes three tables: a country 202 table, a state 204 table, and a city 206 table. Country 202 includes two fields: "Name" and a primary key of "Country ID." State 204 includes three fields: a primary key of "State ID," "Country ID," and "Name." City 206 includes four fields: a primary key of "City ID," "State ID," "Name," and "Population." Fields in country 202, state 204, and city 206 may be stored in a relational database such as a SQL database.

Records in country 202, state 204, and city 206 may be connected via one-to-many relationships. For example, a record in country 202 may be related to multiple records in state 204, and a record in state 204 may be related to multiple records in city 206. Such relationships may be represented by and/or identified using the "State ID" and "Country ID" fields in the tables. For example, the "State ID" field in city 206 may be a foreign key that references the "State ID" primary key in state 204, and the "Country ID" field in state 204 may be a foreign key that references the "Country ID" primary key in country 202. The "State ID" fields in state 204 and city 206 may thus be used to perform joins of records in state 204 and city 206, and the "Country ID" fields in country 202 and state 204 may be used to perform joins of records in country 202 and state 204.

As mentioned above, the data model may also include one or more derived fields (not shown). For example, state 204 may include a lookup field called "Country Name" that looks up the value of the "Name" field in the corresponding record in country 202. As a result, the lookup field may specify the foreign key of "Country ID" to link to country 202 and the "Name" field to identify the field to be looked up.

In another example, state 204 may include a summary field called "Population" that sums the corresponding values of the "Population" field in city 206. In turn, country 202 may also have a summary field called "Population" that sums the corresponding values of the "Population" field in state 204. The "Population" field in state 204 may thus reference city 206 and the scalar "Population" field in city 206, while the "Population" field in country 202 may reference state 204 and the derived "Population" field in state 204.

To obtain data associated with the derived "Population" field in country 202, a query for the data may be generated and executed against the relational database. An abstract representation of the query may be represented using the following "pseudo-SQL":

SELECT country.population FROM country

The abstract representation may then be converted into a query that can be executed against the relational database using the following steps.

First, one or more fields associated with the query may be identified. Because "Population" is a summary field that performs aggregation, inclusion of the primary key of country 202 (e.g"Country ID") in the query may be required by SQL semantics. As a result, the abstract representation may be updated to the following:

SELECT country.population, country.countryID FROM country

Next, necessary joins associated with the fields may be determined. The referencing of state 204 by the "Population" field in country 202 may require a join on state 204. Moreover, the join may require both the "Population" field in state 204 and the foreign key of "Country ID" from state

204. As a result, the necessary join may be represented by the following subquery for state 204:

SELECT state.population, state.countryID_FK FROM state

Joined tables associated with the necessary joins may then be transformed using the previous steps. To transform the joined tables, the previous two steps may be repeated for each joined table. Thus, the transformation may begin with the sub-query for state 204, which specifies fields related to the join of state 204 with country 202.

Next, necessary joins associated with the fields in the sub-query may then be determined. In particular, city 206 may be identified as a necessary join of state 204 because the "Population" field in state 204 summarizes the "Population" field in city 206.

City 206 may then be transformed, thus repeating the initial steps in the query-creation process. First, a sub-query for city 206 is generated:

SELECT city.population, city.stateID_FK FROM city

Unlike fields in the query for country 202 and/or sub-query for state 204, fields in the sub-query for city 206 may be scalar fields. As a result, all fields related to the sub-query may already be included in the sub-query, and no joins are necessary. The sub-query for city 206 may thus be complete, and no additional joins may be required.

Next, state 204 may be joined with city 206. To perform the join, the primary key of state 204 may be joined with the foreign key of city 206 to produce the following:

```
SELECT
    state.population,
    state.countryID_FK,
    state.stateID
FROM
    state
    LEFT JOIN
        (SELECT
            city.population,
            city.stateID_FK
        FROM city)
    ON
        city.stateID_FK = state.stateID
```

Once the join is complete, the transformation of state 204 may be accomplished by expressing the "Population" field in state 204 as a summary:

```
SELECT
    SUM(city.population) as state.population,
    state.countryID_FK, state.stateID
FROM
    state
    LEFT JOIN
        (SELECT
            city.population,
            city.stateID_FK
        FROM city)
    ON
        city.stateID_FK = state.stateID
```

With the sub-query for state 204 completed, the join of state 204 with country 202 may be performed to produce the following:

```
SELECT
    country.population,
    country.countryID
FROM
    country
    LEFT JOIN
        (SELECT
            SUM(city.population) as
                state.population, state.countryID_FK,
            state.stateID
        FROM
            state
            LEFT JOIN
                (SELECT
                    city.population,
                    city.stateID_FK
                FROM
                    city)
            ON city.stateID_FK = state.stateID)
    ON
        state.countryID_FK = country.countryID
```

The query may then be completed by transforming the "Population" field of country 202 into a summary:

```
SELECT
    SUM(state.population) as country.population,
    country.countryID
FROM
    country
    LEFT JOIN
        (SELECT
            SUM(city.population) as state.population,
            state.countryID_FK,
            state.stateID
        FROM
            state
            LEFT JOIN
                (SELECT
                    city.population,
                    city.stateID_FK
                FROM
                    city)
            ON city.stateID_FK = state.stateID)
    ON
        state.countryID_FK = country.countryID
```

The completed query may thus include nested joins that may be executed against a SQL database to produce data for the derived "Population" field in country 202.

Figure 3:
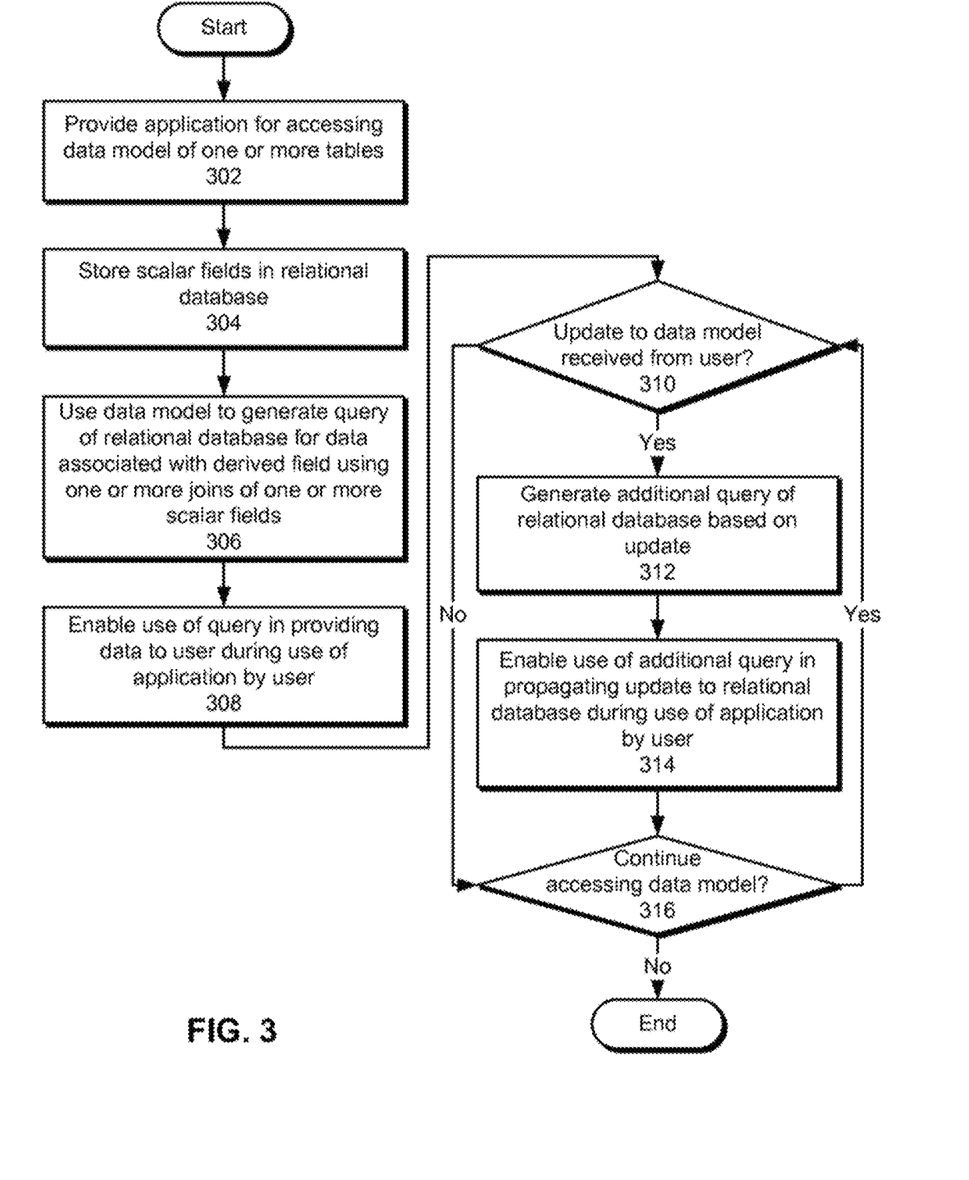
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, an application for accessing a data model of one or more tables is provided (operation 302). The table(s) may include a set of scalar fields, which are stored in a relational database (operation 304), and one or more derived fields, which operate on other fields in the data model. For example, each derived field may be associated with a summary, a lookup, and/or a formula of one or more other fields, which may be scalar or derived.

Next, the data model is used to generate a query of a relational database for data associated with each derived field using one or more joins of one or more scalar fields (operation 306), as discussed in further detail below with respect to FIG. 4. Use of the query in providing the data to a user during use of the application by the user is also enabled (operation 308). For example, the query may be executed against the relational database by the application to allow the user to access values of the derived field through a user interface of the application.

An update to the data model may be received from the user (operation 310) during use of the application by the user. For example, the user may use the update to create a new field, remove an existing field, create a new table, and/or remove an existing table in the data model. If no update is received from the user, no additional queries are generated or executed.

If an update is received from the user, an additional query of the relational database is generated based on the update (operation 312). For example, the additional query may include a "Create," "Alter," "Add," and/or "Drop" statement. Use of the additional query in propagating the update to the relational database during use of the application by the user is then enabled (operation 314). For example, the additional query may be executed against the relational database to synchronize the update to the data model with the corresponding database schema of the relational database.

The data model may continue to be accessed (operation 316) through the application. For example, the user may use the application to view, add, delete, or modify data in the data model; generate reports, forms, and/or other features using the data; and/or share the data and/or features with other users in real-time. If the data model is to be used, the data model may continue to be provided to the user through the application, and updates to the data model from the user may be propagated to the relational database (operations 310-314) during use of the application by the user. Such display and update of the data model may continue until the data model and/or application are no longer used by the user and/or other users.

Figure 4:
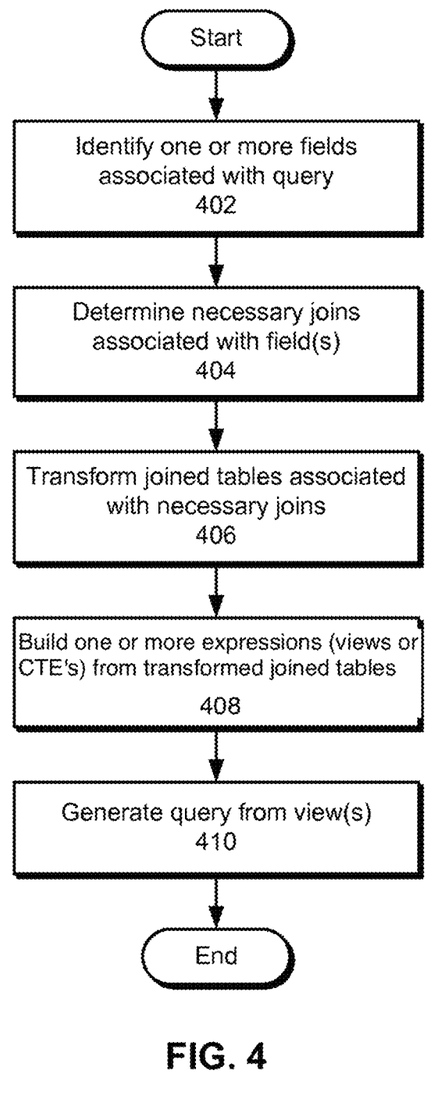
FIG. 4 shows a flowchart illustrating the process of generating a query of a relational database for data associated with a derived field in a data model in accordance with the disclosed embodiments.

FIG. 4 shows a flowchart illustrating the process of generating a query of a relational database for data associated with a derived field in a data model in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, the data model is used to create one or more views of one or more tables in the data model. To create the views, one or more fields associated with the query are identified (operation 402). The field(s) may include the derived field and/or any dependencies and/or criteria associated with the derived field. Next, necessary joins associated with the field(s) are determined (operation 404). The joins may be identified based on references to other tables by the derived field and/or additional references by other derived fields in the other tables. For example, the joins may represent a chain and/or hierarchy of references from a derived field to additional derived fields that terminates in one or more scalar fields.

Joined tables associated with the necessary joins may then be transformed (operation 406). For example, operations 402-404 may be repeated for each joined table associated with the derived field until a joined table that does not require additional transformation (e.g., a table with scalar fields used in the necessary joins) is found. An operation (e.g., summary, lookup, formula) associated with the derived field may then be applied in reverse order to tables to the left of the joins to transform the tables.

After all tables are transformed, one or more views are built from the transformed joined tables (operation 408). For example, the view(s) may represent database operations required to fulfill the query. Finally, the query is generated from the view(s) (operation 410). For example, the view(s) may be used to sequence SQL statements representing various parts of the view(s) to a buffer. The query may then be obtained from the buffer and executed against a relational database corresponding to the data model to provide data for the derived field, as discussed above.

Figure 5:
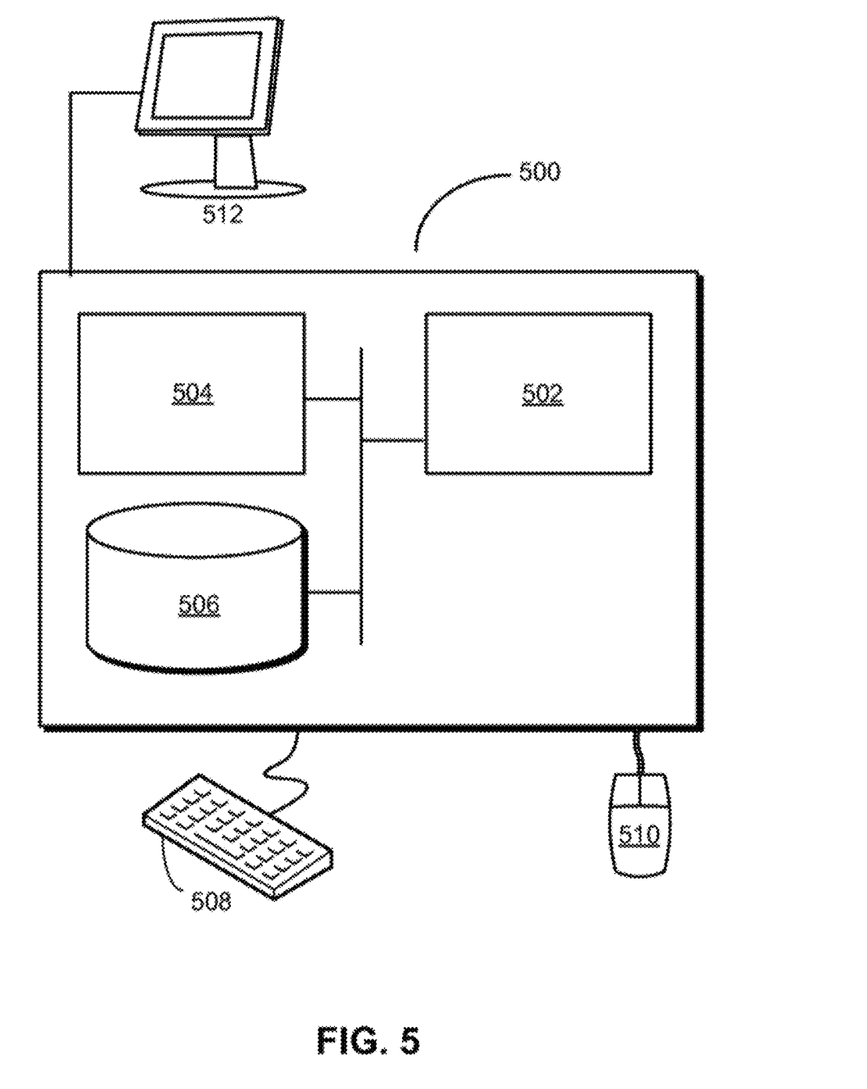
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices such as personal computers, laptop computers, workstations, servers, mobile phones, tablet computers, and/or portable media players. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system may include an application that enables access to a data model of one or more tables, which may contain one or more derived fields and one or more scalar fields. The application may also store the scalar field in a relational database. The system may also include a query builder that uses the data model to generate a first query of the relational database for data associated with the derived field using one or more joins of one or more of the scalar fields and enables use of the first query in providing the data to a user during use of the application by the user. The application may also obtain an update to the data model from the user. In response to the update, the query builder may generate a second query of the relational database corresponding to the update and enable use of the second query in propagating the update to the relational database during use of the application by the user In addition, one or more components of computer system 500 may be remotely located and connected to the other components over a network. Portions of the present embodiments (e.g., application, query builder, relational database, etc.) may also be located on different nodes of a distributed system that implements the embodiments. For example, the present embodiments may be implemented using a cloud computing system that provides dynamic modeling of data in a set of relational databases to a set of remote applications and/or users.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

Further Embodiments

The systems and processes described above generate queries of a relational databases by, inter alia, building views from transformed joined tables and generating relational database queries from those views. Further embodiments of the invention utilize common table expressions (CTE's), in place of views for that purpose. Examples of this are provided in the discussion that follows and in the drawings (e.g., FIGS. 1 and 4), wherein the term "expressions of tables" (or, "expressions," for short) is used in reference to views and CTE's, collectively.

Query generation with CTE's as a replacement to the subquery/views approach for non-scalar datatypes (summaries, lookups and formulas) offers a number of benefits. The query example in below represents a very simple SQL request. Real-world cases, e.g., joining many tables and complex relationships, generate queries which present a number of challenges:

The RDBMS query optimizer is unable to generate a plan that makes use of indices thus generating a sub-optimal query plan and slow response times.

The query is not easily supported by engineering or the RDBMS vendor as complexity increases and readability decreases.

Nested subquery views vary syntactically by database vendor and requires generation by RDBMS to address these variations.

The CTE approach addresses all of these issues. The example set forth in paragraph [0048] written as a CTE is broken down by first generating a summary of the city population grouped by the state id foreign key:

```
WITH city_cte(population, stateidFK) AS (
  SELECT
    SUM(population),
    stateIdFK
  FROM city
  GROUP BY
    stateidFK),
```

This CTE can then be joined with another CTE which aggregates the population by state:

```
state_cte(population, countryIdFk) AS (
  SELECT
    SUM(city_cte.population),
    state.countryIdFK
  FROM state
  LEFT OUTER JOIN
    city_cte ON state.id = city_cte.stateIdFK
  GROUP BY
    state.countryIdFK)
```

Finally, the data requested by the end user, country id and population by country, is generated by joining the state CTE:

```
SELECT
  id,
  state_cte.population
FROM country
LEFT OUTER JOIN state_cte ON country.id = state_cte.countryIdFK;
```

This query is easily digested by the database as there are no complex nested subqueries. Instead a simple, flat CTE is generated and joined when appropriate. This results in far better performing queries and human readable SQL.

The CTE approach is also database agnostic and Quick Base can economically address varying customer needs. For instance, a small business with 5-10 users does not require a high TPS database. We can thus partition swim lanes by need. In addition, non-RDBMS systems such as Amazon's OLAP database, RedShift also supports CTE's. Some of the major databases supporting CTE queries are:

Oracle
SqlServer
PostgreSql
MySQL (beta)
MariaDB
RedShift

It will be appreciated that the embodiments described above are merely examples of the invention, and that other embodiments incorporating changes to those shown herein fall within the scope of the invention, of which we claim:

We claim:

1. A computer-implemented method for processing data, comprising:

executing an application that accesses a dynamic data model stored in a model repository, the dynamic data model including one or more tables, wherein the one or more tables comprise a set of scalar fields and wherein the one or more tables comprise a derived field that references the one or more tables and/or other fields of the data model and that includes an operation to be performed thereon;

storing the scalar fields in a relational database that is separate from the data model and from the model repository and that is managed by a relational database management system;

using the data model to create one or more common table expressions of the one or more tables, generating, using the one or more common table expressions, a first query for the relational database to obtain data from the relational database for use with the operation associated with the derived field, the first query using one or more joins on one or more of the fields/tables referenced in the derived field;

executing the first query against the relational database to provide the data for the derived field during runtime of the application.

2. The computer-implemented method of claim 1, further comprising:
using the application to obtain an update to the data model from the user;
generating a second query for the relational database corresponding to the update; and
enabling use of the second query to propagate the update to the relational database during use of the application by the user.

3. The computer-implemented method of claim 2, wherein the update is associated with at least one of:
creation of a new field;
removal of an existing field;
creation of a new table; and
removal of an existing table.

4. The computer-implemented method of claim 1, wherein using the data model to create the one or more expressions of the one or more tables involves:
identifying one or more fields associated with the query;
determining necessary joins associated with the one or more fields;
transforming joined tables associated with the necessary joins; and
building the one or more expressions from the transformed joined tables.

5. The computer-implemented method of claim 4, wherein the necessary joins comprise nested joins.

6. The computer-implemented method of claim 1, wherein the query comprises a Structured Query Language (SQL) query.

7. The computer-implemented method of claim 1, wherein the data is provided to the user through a user interface of the application.

8. A computer system for processing data, comprising:
an application configured to:
enable access to a dynamic data model stored in a model repository, the dynamic data model including one or more tables, wherein the one or more tables comprise a set of scalar fields and wherein the one or more tables comprise a derived field that references the one or more tables and/or other fields of the data model and that includes an operation to be performed thereon; and
store the scalar fields in a relational database that is separate from the data model and from the model repository and that is managed by a relational database management system; and
a query builder configured to:
use the data model to generate, using one or more common table expressions of the one or more tables, a first query for the relational database to obtain data from the relational database for use with the operation associated with the derived field, the first query using one or more joins on one or more of the fields/tables referenced in the derived field; and
wherein the application is further configured to
execute the first query against the relational database to provide data for the derived field during use of the application.

9. The system of claim 8,
wherein the application is further configured to obtain an update to the data model from the user, and
wherein the query builder is further configured to:
generate a second query for the relational database corresponding to the update; and
enable use of the second query to propagate the update to the relational database during use of the application by the user.

10. The system of claim 9, wherein the update is associated with at least one of:
creation of a new field;
removal of an existing field;
creation of a new table; and
removal of an existing table.

11. The system of claim 9, wherein using the data model to create the one or more expressions of the one or more tables involves:
identifying one or more fields associated with the query;
determining necessary joins associated with the one or more fields;
transforming joined tables associated with the necessary joins; and
building the one or more expressions from the transformed joined tables.

12. The system of claim 11, wherein the necessary joins comprise nested joins.

13. A non-transitory computer-readable storage medium storing instructions that when executed by a computer cause the computer to perform a method for processing data, the method comprising:
executing an application that accesses a dynamic data model stored in a model repository, the dynamic data model including one or more tables, wherein the one or more tables comprise a set of scalar fields and wherein the one or more tables comprise a derived field that references one or more tables and/or other fields of the data model and that includes an operation to be performed thereon;
storing the scalar fields in a relational database that is separate from the data model and from the model repository and that is managed by a relational database management system;
using the data model to create one or more common table expressions of the one or more tables,
generating, using the one or more common table expressions, a first query for the relational database to obtain data from the relational database for use with the operation associated with the derived field, the first query using one or more joins on one or more of the fields/tables referenced in the derived field; and
executing the first query against the relational database to provide the data for the derived field during runtime of the application.

14. The non-transitory computer-readable storage medium of claim 13, the method further comprising:
using the application to obtain an update to the data model from the user;
generating a second query for the relational database corresponding to the update; and
enabling use of the second query to propagate the update to the relational database during use of the application by the user.

15. The non-transitory computer-readable storage medium of claim 13, wherein using the data model to create the one or more expressions of the one or more tables involves:
identifying one or more fields associated with the query;
determining necessary joins associated with the one or more fields;

transforming joined tables associated with the necessary joins; and building the one or more expressions from the transformed joined tables.

16. The non-transitory computer-readable storage medium of claim 15, wherein the necessary joins comprise nested joins.

17. The non-transitory computer-readable storage medium of claim 13,
wherein the operation is at least one of a summary, a formula, and a lookup.

18. A computer-implemented method for processing data, comprising:
executing an application that accesses a dynamic data model stored in a model repository, the dynamic data model including one or more tables, wherein the one or more tables comprise a set of scalar fields and wherein the one or more tables comprise a derived field that references the one or more tables and/or other fields of the data model and that includes an operation to be performed thereon;
storing the scalar fields in a relational database that is separate from the data model and from the model repository and that is managed by a relational database management system;
using the data model to create one or more views of the one or more tables,
generating, using the one or more views, a first query for the relational database to obtain data from the relational database for use with the operation associated with the derived field, the first query using one or more joins on one or more of the fields/tables referenced in the derived field;
executing the first query against the relational database to provide the data for the derived field during runtime of the application.

19. The computer-implemented method of claim 18, further comprising:
using the application to obtain an update to the data model from the user;
generating a second query for the relational database corresponding to the update; and
enabling use of the second query to propagate the update to the relational database during use of the application by the user.

20. The computer-implemented method of claim 19, wherein the update is associated with at least one of:
creation of a new field;
removal of an existing field;
creation of a new table; and
removal of an existing table.

21. The computer-implemented method of claim 18, wherein using the data model to create the one or more views of the one or more tables involves:
identifying one or more fields associated with the query;
determining necessary joins associated with the one or more fields;
transforming joined tables associated with the necessary joins; and
building the one or more expressions views from the transformed joined tables.

22. The computer-implemented method of claim 21, wherein the necessary joins comprise nested joins.

23. The computer-implemented method of claim 18, wherein the query comprises a Structured Query Language (SQL) query.

24. The computer-implemented method of claim 18, wherein the data is provided to the user through a user interface of the application.

25. A computer system for processing data, comprising:
an application configured to:
enable access to a dynamic data model stored in a model repository, the dynamic data model including one or more tables, wherein the one or more tables comprise a set of scalar fields and wherein the one or more tables comprise a derived field that references the one or more tables and/or other fields of the data model and that includes an operation to be performed thereon; and
store the scalar fields in a relational database that is separate from the data model and from the model repository and that is managed by a relational database management system; and
a query builder configured to:
generate, using one or more common table expressions of the one or more tables, a first query for the relational database to obtain data from the relational database for use with the operation associated with the derived field, the first query using one or more joins on one or more of the fields/tables referenced in the derived field; and
wherein the application is further configured to execute the first query against the relational database to obtain data associated with the derived field.

26. The system of claim 25, wherein the application is further configured to obtain an update to the data model from the user, and
wherein the query builder is further configured to:
generate a second query for the relational database corresponding to the update; and
enable use of the second query to propagate the update to the relational database during use of the application by the user.

27. The system of claim 26, wherein the update is associated with at least one of:
creation of a new field;
removal of an existing field;
creation of a new table; and
removal of an existing table.

28. The system of claim 26, wherein using the data model to create the one or more expressions of the one or more tables involves:
identifying one or more fields associated with the query;
determining necessary joins associated with the one or more fields;
transforming joined tables associated with the necessary joins; and
building the one or more expressions from the transformed joined tables.

29. The system of claim 28, wherein the necessary joins comprise nested joins.

30. A non-transitory computer-readable storage medium storing instructions that when executed by a computer cause the computer to perform a method for processing data, the method comprising:
executing an application that accesses a dynamic data model stored in a model repository, the dynamic data model including one or more tables, wherein the one or more tables comprise a set of scalar fields and wherein the one or more tables comprise a derived field that references the one or more tables and/or other fields of the data model and that includes an operation to be performed thereon;

storing the scalar fields in a relational database that is separate from the data model and from the model repository and that is managed by a relational database management system;

using the data model to create one or more common table expressions of the one or more tables, generating, using the one or more common table expressions, a first query for the relational database to obtain data from the relational database for use with the operation associated with the derived field, the first query using one or more joins on one or more of the fields/tables referenced in the derived field; and executing the first query against the relational database to provide the data for the derived field during runtime of the application.

31. The non-transitory computer-readable storage medium of claim 30, the method further comprising:

using the application to obtain an update to the data model from the user;

generating a second query for the relational database corresponding to the update; and enabling use of the second query to propagate the update to the relational database during use of the application by the user.

32. The non-transitory computer-readable storage medium of claim 30, wherein using the data model to create the one or more expressions of the one or more tables involves:

identifying one or more fields associated with the query;

determining necessary joins associated with the one or more fields;

transforming joined tables associated with the necessary joins; and building the one or more expressions from the transformed joined tables.

33. The non-transitory computer-readable storage medium of claim 32, wherein the necessary joins comprise nested joins.

34. The non-transitory computer-readable storage medium of claim 30, wherein the operation is at least one of a summary, a formula, and a lookup.

* * * * *